No. 672,520. Patented Apr. 23, 1901.
W. BENZING.
BUCKET.
(Application filed June 9, 1900.)
(No Model.)
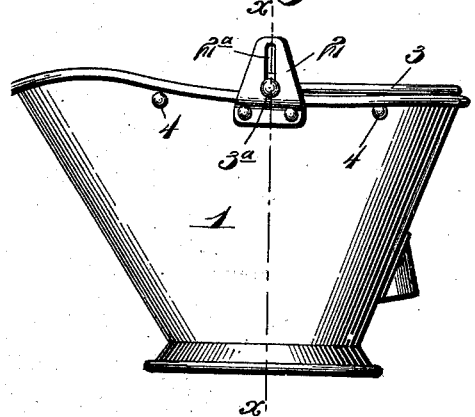
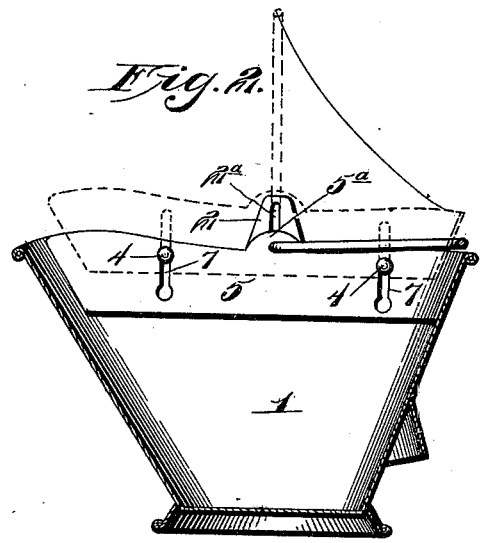
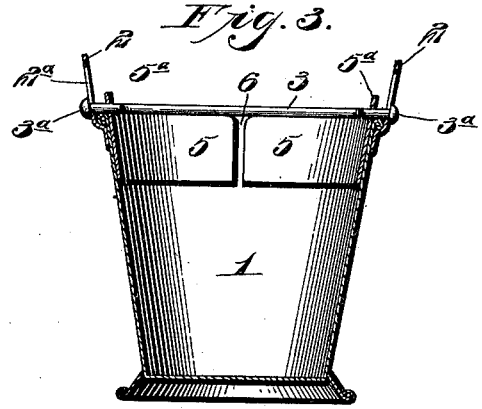
Witnesses
Louis D. Heinrichs
F. O. M'Cleary.
Inventor
William Benzing,
By Victor J. Evans Attorneys

UNITED STATES PATENT OFFICE.

WILLIAM BENZING, OF DERBY, OHIO.

BUCKET.

SPECIFICATION forming part of Letters Patent No. 672,520, dated April 23, 1901.

Application filed June 9, 1900. Serial No. 19,766. (No model.)

*To all whom it may concern:*

Be it known that I, WILLIAM BENZING, a citizen of the United States, residing at Derby, in the county of Pickaway and State of Ohio, have invented new and useful Improvements in Buckets, of which the following is a specification.

The object of this invention is to provide a bucket or other suitable vessel, and especially a coal-hod, with a fender which will be thrown into operative position automatically in lifting such vessel, while during the operation of filling it will remain without its fending function, and thus prevent the vessel from being filled so full that a part of the contents will be spilled in carrying.

The invention consists, therefore, in providing a bucket or other vessel with an extensible portion around its sides, adapted to lie normally below the vessel's rim and to be raised into an extended position above the same as the automatic result of lifting said vessel.

Further, the invention consists in certain other novel features in the construction and arrangement of parts, all as hereinafter described, and set forth in the appended claims.

In the drawings, Figure 1 is a view in side elevation of a coal-hod having the invention applied thereto; Fig. 2, a sectional view showing the fender in its normal position in full lines and indicating in dotted lines the position assumed by it when the hod is being lifted, and Fig. 3 a transverse sectional view taken on the line $xx$ of Fig. 1 and looking to the rear.

Referring to the accompanying drawings, 1 designates a coal-hod of well-known form and construction and provided with ears 2, in which is pivotally secured the bail 3.

Within the hod and secured to the sides thereof by means of bolts 4 are arranged the fenders 5, which comprise, preferably, two narrow metal strips which extend from a point 6 at the rear of the hod to the mouth or pouring end thereof and leaving such end unobstructed. The fender-strips 5 are bent to conform to the sides of the hod and are provided with vertical slots 7, through which the bolts 4 pass, thus permitting the said strips to be raised and lowered within the limits of the slots and causing them to rest normally of their own weight, as shown in Figs. 2 and 3, with their upper edges flush with the rim of the hod. The slots are enlarged sufficiently at their lower ends to receive the interior heads of the bolts and readily permit the fender-strips to be removed or attached when desired. These strips are formed with ears $5^a$, which are perforated to receive the ends of the bail 3, which after passing through the same and the ear 2 is provided with a nut or head $3^a$. Instead of the usual pivoting of the bail within the ear 2 a slot $2^a$ is provided, which permits the bail in lifting to move upward the length of said slot and the fenders to be also raised as a result of the movement, as shown in Fig. 2. The length of the slot $2^a$, as will be seen, is not sufficient to permit the fenders to be raised the full limit of slots 7 and make liable their displacement by reason of the bolt-heads passing through the enlarged portion of the slots, and thus it will be seen that the movement of the bail also controls the fenders and that to remove the fenders it becomes necessary to first remove the bail.

From the foregoing it will be readily observed that the fenders will not remain above the rim of the hod when it is empty and will not drop down when it is full, as the outward pressure of the contents will keep the fenders tightly pressed to the sides and cause them to retain their proper shape. The fender is brought into operative position by the bail of the hod without any extra or special use of the bail other than that employed in its ordinary function of lifting and carrying the hod.

Having thus fully described the invention, what I claim as new, and desire to secure by Letters Patent, is—

1. The combination with a bucket or like vessel; of a fender, comprising independent sections curved to conform to the shape of the sides of the bucket, and formed with vertically-disposed elongated slots; bolts passing through said slots and through the sides of the bucket; and a bail secured at its ends to said fender-sections.

2. The combination with a bucket or other vessel; of a fender comprising two independent sections curved to conform to the shape of the sides of the vessel, and formed with vertically-disposed elongated slots; lugs projecting from the upper edges of said sections and formed with elongated slots; bolts extending through the slots of the fender, and through the sides of the vessel; and a bail, the ends of which are loosely secured within the slots of said lugs whereby the fender is elevated to a position above the rim of the vessel when the vessel is lifted by its bail.

3. The combination with a bucket; of a fender comprising independent sections bent to conform to the shape of the sides of the bucket, the front ends of said sections being separated to afford a discharge-space for the bucket, said fender-sections each being provided with elongated vertically-disposed slots and with slotted lugs; bolts extending through the slots in the sections and through the sides of the bucket; and a bail the ends of which extend through said slotted lugs, whereby the lifting of the bucket by its bail elevates the fender-sections to a position above the rim of the bucket.

In testimony whereof I affix my signature in presence of two witnesses.

WILLIAM BENZING.

Witnesses:
W. L. CURRY,
ELMER C. MURPHY.